March 16, 1948. A. W. SCHMITZ 2,437,973
ELECTRICAL TENSIONING CONTROL SYSTEM
Filed Dec. 28, 1945
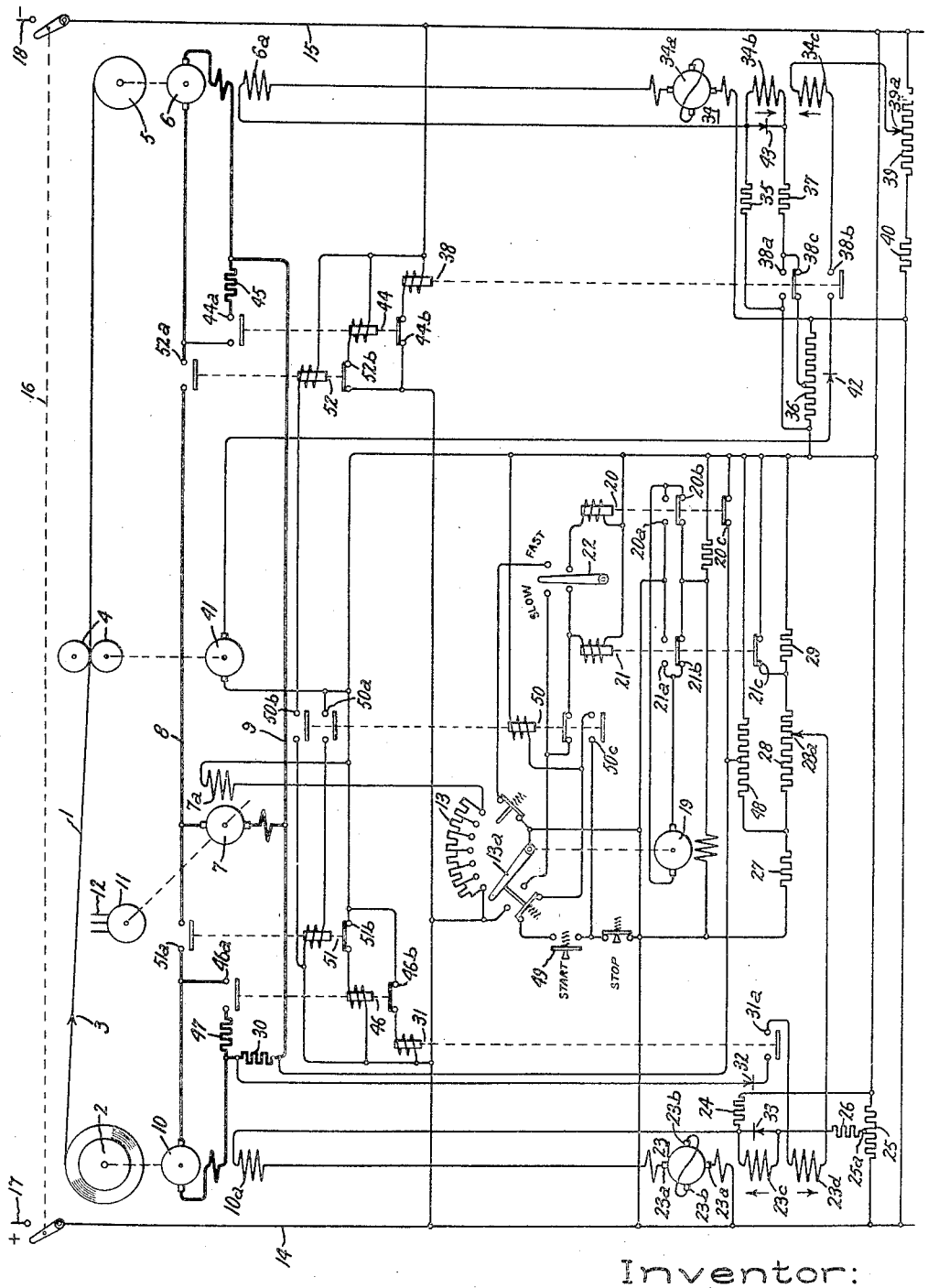
Inventor:
Anton W. Schmitz,
by Claude A. Mott
His Attorney.

Patented Mar. 16, 1948

2,437,973

UNITED STATES PATENT OFFICE 2,437,973

ELECTRICAL TENSIONING CONTROL SYSTEM

Anton W. Schmitz, Schenectady, N. Y., assignor to General Electric Company, a corporation of New York Application December 28, 1945, Serial No. 637,675

7 Claims. (Cl. 318—6)

This invention relates to control systems, more particularly to control systems for dynamo electric machines, and it has for an object the provision of a simple, reliable and improved control system of this character. More specifically, the invention relates to control systems for dynamo electric machines which are subjected to constant power, variable torque loads.

In carrying the invention into effect in one form thereof the field excitation circuit of the controlled dynamo electric machine is connected across a pair of supply conductors. The armature of an exciter is connected in the excitation circuit. It is provided with a directional control field winding which is connected to be excited by the voltage across a portion of the excitation circuit. The exciter is also provided with an additional control field winding which opposes the directional field winding and is energized by the difference between a reference voltage and a signal voltage which is dependent upon a characteristic of the controlled dynamo electric machine. This additional control field winding controls the exciter to vary the current in the excitation circuit to counteract variations in the regulated characteristic. A non-linear resistance device connected in parallel with the directional control field winding minimizes the magnitude of the change in the regulated characteristic which is required to produce a predetermined change in the current in the excitation circuit of the controlled machine.

For a better and more complete understanding of the invention, reference should now be had to the following specification and the accompanying drawing of which the single figure is a simple, diagrammatical representation of the embodiment of the invention.

In illustrating the invention in one form thereof it is shown as embodied in apparatus or unwinding a strip of material from one reel and rewinding it on another reel. During this operation it is required that the tension in the strip, and also the strip speed, be maintained reasonably constant. Since the diameter of the strip on both reels is continuously changing, the torque applied to the shafts of the reels must vary as the diameter varies in order to maintain the tension in the strip constant, and the speeds of the reels must vary inversely with the diameters in order to maintain constant strip speed.

Referring now to the drawing, a strip of material 1 is being unwound from a full reel 2 and passed in the direction of the arrow 3 through a pair of idler rolls 4 and wound upon the winding-up reel 5. The reel 5 is driven by suitable means such as the dynamo electric machine 6 which operates as a motor. Although the motor 6 may be of any suitable type it is preferably a shunt wound D.-C. motor. It is supplied from a suitable source such as the adjustable voltage generator 7 to which the armature terminals of the motor are connected by means of conductors 8 and 9.

For the purpose of maintaining back-tension between the idler rolls 4 and the unwinding reel 2, a dynamo electric machine 10 which is in all respect identical with the motor 6 is mechanically coupled to the shaft of the unwinding reel. The armature terminals of the dynamo electric machine 10 are connected to the armature terminals of the variable voltage generator 7, and the machine 10 operates as a generator driven by the unwinding reel to supply pump-back current to the generator 7. As a result of this operation the machine 10 produces a braking torque on the unwinding reel 2, thereby building up a tension in the strip 1 between the reel and the idler rolls.

The adjustable voltage generator 7 is driven at a speed which is preferably substantially constant by any suitable driving means such, for example, as an induction motor 11 which is supplied from any suitable A.-C. source such as represented by the three supply lines 12.

As shown, the generator 7 is provided with a shunt field winding 7a which is connected in series with a rheostat 13 across the supply conductors 14, 15. These supply conductors are arranged to be connected by suitable switching means 16 to a source such, for example, as a 250 volt D.-C. supply which is represented by the two supply lines 17, 18. The rheostat 13 may be manually operated but is preferably driven by a motor 19 of which the armature is arranged to be connected to the supply conductors by means of suitable reversing switching contactors 20 and 21 which are under the control of a suitable manually operated reversing type master switch 22. When the master switch is operated to the right-hand or "fast" position, the contactor 20 closes its normally open contacts 20a and opens its normally closed contacts 20b so that the pilot motor 19 is connected to the supply conductors 14, 15 for rotation in a direction in which the slider 13a of the rheostat is moved to cut out resistance to increase the voltage of the generator 7 and thereby increase the speeds of motor 6, the machine 10 and the strip 1. Consequently the contactor 20 is referred to as the accelerating contactor. Similarly, when the master switch is operated to its left-hand or "slow" position, the operating coil of the contactor 21 is energized and closes its normally closed contacts 21a and opens its normally closed contacts 21b so that the motor 19 is connected to the supply conductors 14, 15 for rotation in the reverse direction. Thus, the slider 13a is moved in a direction to insert resistance in the generator field circuit, thereby to decrease its voltage and correspondingly decrease the speeds of the dynamo electric machines 6 and 10. Consequently the contactor 21 is referred to as the decelerating contactor.

The dynamo electric machine 10 which operates as a generator is provided with a shunt field winding 10a which is connected to the supply conductors 14, 15. For the purpose of varying the excitation of the machine 10 to vary its torque, a suitable exciter dynamo electric machine 23 is provided. This machine is driven by any suitable driving means, (not shown), at a substantially constant speed. The armature of the machine 23 is connected in series with the field winding 10a and a resistance 24. Although the exciter may be of any suitable type it is preferably an armature reaction excited dynamo electric machine of the type which is known as an amplidyne. It is provided with a pair of load brushes 23a and a pair of brushes 23b which are arranged on an axis which is displaced 90 electrical degrees from the axis of the load brushes. The brushes 23b are short circuited.

The amplidyne is provided with a directional or reference field winding 23c and an opposing control field winding 23d. Two important operating characteristics of an amplidyne are its exceptionally high speed of response and its high amplification factor, i. e. the ratio between the watts input to the control field windings and the watts output at the load brushes. This ratio in many commercial machines is as large as 25,000 to 1.

A voltage divider 25 is connected across the supply conductors 14, 15 and the reference field winding 23c is connected from the junction point of the field winding 10a and the resistor 24 through a resistor 26 to a point on the voltage divider 25. Thus, the reference field winding is excited in response to the difference between the voltage drop across a selected portion of the excitation circuit and the voltage drop across a selected portion of the voltage divider. In other words, it is excited in response to the difference of the voltage drop across the resistor 24 and the voltage drop across the portion of the divider 25 between the terminal 25a and the negative supply conductor 15.

The control field winding 23d is excited in response to the difference of a reference voltage and a signal voltage which is dependent upon the operating characteristic which it is desired to control. It is desired to control the dynamo electric machine 10 to maintain constant back tension in the strip 1 between the rolls 4 and the reel 2. This is accomplished by maintaining the power pumped back from the machine 10 to the generator substantially constant. Since the voltage of the generator 7 is constant, constant power of machine 10 is produced by maintaining the armature current constant. Consequently the control field winding 23d is excited in response to the difference between a reference voltage and a signal voltage proportional to armature current. This reference voltage is produced by means of a voltage divider comprising the fixed resistor 27, the adjustable resistor 28 and the fixed resistor 29 connected in series relationship across the supply conductors 14, 15. The signal voltage is obtained from the IR voltage drop produced across a resistor 30 which is connected in series relationship in the armature circuit of the dynamo electric machine 10. One terminal of the control field winding 23d is connected to the slider of the adjustable resistor 28 and the other terminal is connected through the contacts 31a of a field control relay 31, a blocking rectifier 32 to the positive terminal of the IR drop resistor 30 of which the negative terminal is connected through the contacts 20c to the negative supply conductor 15. Thus, when the signal voltage, i. e. the voltage drop across the resistor 30 exceeds the reference voltage, i. e. the voltage between the negative supply conductor 15 and the slider 28a, the control field winding 23d is excited by the difference of these voltages. Owing to the effect of the blocking rectifier 32, the control field winding 23d is completely deenergized when the signal voltage is less than the reference voltage. Since the magnetomotive forces of the directional field winding 23c and the control field winding 23d oppose each other, the net control flux is equal to the difference of the ampere turns produced by the two field windings.

For the purpose of minimizing the change in the regulated characteristic which is required to produce a predetermined change in the current in the circuit of field winding 10a, a non-linear resistance device 33 is connected in parallel with the directional control field winding 23c. Although this non-linear resistance may be of any suitable type, it is preferably a selenium type disc. An important property of this non-linear resistance is that the current which it conducts increases at a rate which is greater than the rate of increase of the applied voltage. Consequently, when the voltage applied to the selenium resistor 33 is increased, a greater portion of the resulting increase in current flows through the non-linear resistor than flows through the directional field winding 23c. The net result is that large changes in voltage produce only relatively small changes in the excitation of the directional field winding.

For the purpose of controlling the excitation of the field winding 6a of the winding reel motor 6, the armature 34a of an amplidyne exciter 34 is connected in series relationship with the field winding 6a and a permanent resistor 35 across the supply conductors 14, 15. The amplidyne exciter 34 is in all respects identical with the amplidyne exciter 23.

A voltage divider 36 is connected across the supply conductors 14, 15. The directional field winding 34b is connected to be excited by the voltage across a predetermined portion of the excitation circuit i. e. the voltage across the resistor 35. Thus, one terminal of the control field winding 34b is connected to the terminal of the resistor 35 which is connected to the field winding 6a and the other terminal of the field winding is connected through a resistor 37 and normally open contacts 38a of a field control relay 38 to the negative supply conductor 15.

The control field winding 34c of the amplidyne is excited in accordance with the difference of a reference voltage and a signal voltage which is proportional to the characteristic which is to be controlled. This reference voltage is provided by means of a potentiometer 39 which is connected in series relationship with a permanent resistor 40 across the supply lines 14, 15. The potentiometer is provided with a slider 39a, the position of which determines the magnitude of the reference voltage.

In the reeling application to which this control system is applied, it is desired to maintain the strip speed substantially constant. Consequently, the signal voltage is derived from the speed of the strip. For this purpose a tachometer generator 41 is mechanically coupled to the idler rolls 4. Since the speed of the idler rolls corresponds to the speed of the strip, the voltage generated by the tachometer generator is proportional to the speed of the strip.

One terminal of the control field winding 34c is connected to the slider 39a of the potentiometer 39. The other terminal of the control field winding is connected through the normally open contacts 38b of control relay 38 and a blocking rectifier 42 to the positive terminal of the tachometer generator 41 of which the negative terminal is connected to the negative supply line 15. The polarity of the rectifier 42 is such that when the signal voltage, i. e. the voltage of the tachometer generator, exceeds the reference voltage, i. e. the voltage between the negative supply conductor 15 and the slider 39a of the potentiometer, the control field winding 34b is excited by the difference of these voltages. When the signal voltage is less than the reference voltage, the control field winding is totally deenergized.

Since the magnetomotive forces of the directional control field winding 34b and the speed control field winding 34c oppose each other, the net control flux of the amplidyne 34 is equal to the difference of these magnetomotive forces. For the purpose of minimizing the change in the regulated characteristic, i. e. strip speed which is required to effect a predetermined change in the current of the field winding 6a, a non-linear resistance device 43 is connected in parallel with the directional control winding 34b. This non-linear resistance 43 is also preferably a selenium disc resistor.

In order to effect rapid retardation of the winding reel when stopping, a contactor 44 is provided for connecting a dynamic braking resistor 45 in parallel with the armature of the motor 6. A similar contactor 46 is provided for connecting a dynamic braking resistor 47 in parallel with the armature of the machine 10.

For the purpose of maintaining the tension in the strip constant at the same value during acceleration as during operation at constant speed, a resistor 48 is provided which is connected from the junction point of the resistors 27 and 28 to the negative conductor 15. When the master switch 22 is in the right-hand or accelerating position, the accelerating contactor inserts a portion of the resistor 48 in circuit with the voltage drop resistor 30, thereby adding the voltage across this portion to the signal voltage with the result that the armature current of the dynamo electric machine 10 is maintained constant at a value which is lower than the value required to maintain the same constant tension during operation at constant strip speed. Similarly, when the master switch 22 is in the left-hand or decelerating position, the decelerating contactor 21 inserts the resistor 29 in series with the variable resistor 28 and fixed resistor 27, thereby increasing the reference voltage. This results in increasing the armature current of the machine 10 to a value that is higher than that which is required to produce the same tension in the strip when operating at constant speed.

The build-up of the coil on the winding reel and the build-down of the coil on the unwinding reel may be of such magnitudes as to require that the field currents of the dynamo electric machines 6 and 10 be varied over a range of 4:1 or greater. This wide range is attained by operation of the amplidynes 23 and 34 as buck-boost exciters. It may be assumed that at full excitation the amplidynes 23 and 34 generate 150 volts. At full reel the voltage of the amplidyne 23 adds to the voltage across the supply conductors 14, 15 which was assumed to be 250 volts. Thus, at full reel the voltage applied to the excitation circuit of the machine 10 is 400 volts. At empty reel the voltage of the amplidyne 23 opposes the voltage across the conductors 14, 15 so that the net voltage applied to the excitation circuit is 100 volts. This results in varying the excitation over a range of 4:1. Similarly, when the winding reel is full the voltage of the amplidyne 34 adds to the voltage across the supply conductors 14, 15 so that 400 volts is applied to the excitation circuit. At empty reel the voltage of the amplidyne opposes the voltage across the supply conductors 14, 15 so that 100 volts is applied to the excitation circuit. When the diameters of the coils on both reels are equal, the voltages generated by both amplidynes 23 and 34 are zero and only the supply line voltage of 250 volts is applied to the excitation circuits. For intermediate values of coil diameters, the voltages applied to the excitation circuits have corresponding intermediate values.

With the foregoing understanding of the elements and their organization, the operation of the system itself will be readily understood from the following detailed description:

It is assumed that the amplidynes 23 and 34 and the supply generator 7 are being driven at the proper speeds. It is further assumed that the slider 13a of the generator field rheostat is in the full resistance position. The switch 16 is moved to the closed position in which the supply conductors 14 and 15 are connected to the supply source 17, 18. Since the control field winding 23c of amplidyne 23 is poled to cause the voltage of amplidyne 23 to add to the supply voltage at full reel, full voltage is applied to the excitation circuit and maximum current flows in the field winding 10a. The control field winding 34b of amplidyne 34, being oppositely poled, its voltage opposes the voltage of the supply conductors 14, 15 so that minimum current flows in the field winding 6a of the winding reel motor. If the current in the field winding 10a should tend to increase, the voltage across the resistor 24 would increase correspondingly, thereby reducing the difference between the voltage across the resistor 24 and the voltage between the supply conductor 15 and the tap 25a. This would result in weakening the excitation of field winding 23c, thereby to decrease the voltage of amplidyne 23 and the voltage applied to the excitation circuit with the result that the field current would be restored to normal. Similarly, if the field current in the field winding 10a tends to decrease, the excitation of the field winding 23c is increased, thereby increasing the voltage applied to the excitation circuit. The directional field winding 34b of amplidyne 34 operates in a similar manner.

The operation is started by depressing the start button switch 49 to complete an energizing circuit for the operating coil of the control relay 50. In response to energization, the relay 50 picks up to close its normally open contacts 50a and 50b and closes its normally open contacts 50c to seal itself in around the contacts of the start button which may now be released. In closing, contacts 50a and 50b complete energizing circuits for the operating coils of line contactors 51 and 52 respectively.

In response to energization, line contactor 51 closes its normally open contacts 51a to complete connections of the armature of the dynamo electric machine 10 to the armature of the supply generator 7 and simultaneously contactor 52 closes its normally open contacts 52a to connect the armature of the winding reel motor 6 to the armature terminals of the supply generator 7. At the same time, line contactors 51 and 52 open their normally closed contacts 51b and 52b respectively and these contacts in opening interrupt the energizing circuits for the operating coils of the dynamic braking contactors 46 and 44 respectively. Responsive to deenergization, the dynamic braking contactors 46 and 44 drop out and open their normally open contacts 46a and 44a to interrupt the dynamic braking circuits about the armatures of the dynamo electric machine 10 and the winding reel motor 6. In dropping out, the dynamic braking contactors 46 and 44 also close their normally closed contacts 46b and 44b respectively.

The contacts 46b and 44b in closing complete energizing circuits for the operating coils of the field control relays 31 and 38 respectively. In response to energization, the field control relay 31 closes its normally open contacts 31a to complete the circuit of the control field winding 23d. Likewise, relay 38 closes its normally open contacts 38a and 38b and opens its normally closed contacts 38c.

Since the full amount of the resistance 13 is inserted in the circuit of the field winding 7a the supply generator generates a low voltage with the result that the winding reel motor rotates at a very slow speed to unwind the strip from the reel 2 and to wind the strip on the reel 5.

The operation is accelerated to full speed by moving the master switch to the right-hand or fast position in which an energizing circuit is completed for the operating coil of the accelerating contactor 20. In response to energization, contactor 20 closes its normally open contacts 20a and opens its normally closed contacts 20b. As a result, the rheostat motor 19 is operated in a direction to rotate the slider 13a in a clockwise direction to cut resistance out of the generator field circuit, thereby increasing the voltage of the supply generator 7 and correspondingly increasing the speeds of the dynamo electric machines 6 and 10 and the strip 1. When the desired strip speed is obtained, which may be assumed to be full speed, the master switch 22 is returned to its central or neutral position, thereby dropping out the accelerating contactor 20 and stopping the motor 19.

As the diameter of the coiled strip on the winding reel begins to increase, the speed of the strip increases since the speed of motor 6 tends to remain constant. This increase in strip speed causes the tachometer generator 41 to generate an increased voltage. If the speed of the strip exceeds the desired value which is preset upon the speed-adjusting rheostat 39, the voltage of the tachometer generator 41 exceeds the reference voltage which is measured from the supply conductor 15 to the slider 39a and current flows in the field winding 34c in the direction of the arrow. As a result, the field winding 34c is energized and its magnetomotive force opposes the magnetomotive force of the directional field winding 34b. This weakens the excitation of the amplidyne 34, thereby decreasing its voltage. Since the voltage of the amplidyne 34 opposes the supply voltage, the excitation of the motor field winding 6a is correspondingly strengthened and the speed of the motor 6 is reduced.

As the field current of the motor 6 increases, the voltage drop across the resistor 35 increases correspondingly. Consequently, the voltage applied to the directional field winding 34b of the amplidyne exciter and the current flowing in this winding are correspondingly increased. However, the ampere turns of the directional field winding 34b are in the wrong direction, i. e. they are in a direction which tends to weaken the field of the motor and therefore the increase in ampere turns of this winding must be balanced out by an equal number of ampere turns of the speed control field winding. Although the speed of the motor 6 is reduced, the speed of the strip is not restored to the preset value from which it departed. It remains sufficiently greater than the preset value to cause the speed control field winding 34c to produce the ampere turns required to effect the reduction in motor speed plus the number of ampere turns required to balance out the increased ampere turns of the directional field winding produced by the increased voltage drop across resistor 35.

Although the foregoing operation is described as taking place in series of successive steps, it will be understood that actually these steps are non-existent and the final balanced condition is reached almost instantaneously. This operation progresses smoothly until at the end of the winding operation the amplidyne exciter 34 is producing full voltage of reverse polarity. Thus, maximum voltage, which was assumed to be four times the initial minimum voltage, is applied to the motor field circuit and maximum current flows. As a result, the voltage drop across the resistor 35 is increased in the same ratio, i. e. approximately 4:1. In the absence of the non-linear resistance 43, this increased voltage would increase the ampere turns of the directional field winding 34b in substantially the same ratio, i. e. 4:1. In other words, its ampere turns at the end of the winding operation would be approximately four times its ampere turns at the beginning of the operation. As pointed out in the foregoing, these ampere turns are in the wrong direction and a very large departure of the strip speed from the preset value would be required to cause the speed control field winding 34c to balance them out. However, owing to the non-linear characteristic of resistor 43, almost all of the increased current flows through the resistor. Only a relatively small portion of it flows through the directional field winding. Consequently, the amount of departure of the strip speed from the preset value which is required to balance out the increased ampere turns of the directional field winding is greatly reduced and the accuracy of speed regulation is correspondingly increased. In a typical example, the departure of the strip speed from the preset value required to balance out the increased ampere turns of the directional field winding 34b is decreased more than 50% and thus the accuracy of regulation is increased by approximately the same amount.

At the opposite end of the machine the operation is similar. With reel 2 full at the beginning of the unwinding operation the current flows in the directional field winding 23c of amplidyne 23 in such a direction that the voltage of the amplidyne adds to the supply voltage and maximum voltage is therefore applied to the field circuit of the dynamo electric machine 10 which is operating as a generator driven by the strip and pumping back energy to the supply generator 7.

As the diameter of the coil on the unwinding reel begins to decrease, the speed at which the machine 10 is driven increases correspondingly. This increases the voltage generated by the machine 10 which in turn increases the current pumped back to the supply generator 7. As a result of the increased current the IR voltage drop across the resistor 30 is correspondingly increased and when this voltage drop exceeds the reference voltage, i. e. the voltage between the negative conductor 15 and the slider 28a, current flows in the current control field winding 23d in such a direction that its magnetomotive force opposes the magnetomotive forces of the directional field winding 23c. As a result, the voltage of the amplidyne exciter 23 is reduced and the voltage applied to the field circuit of the machine 10 is correspondingly reduced. Reduction in applied voltage reduces the field current of the machine 10, thereby reducing the current pumped back to the supply generator 7. As the field current of the machine 10 decreases, the voltage drop across the resistor 24 decreases correspondingly. Consequently the voltage applied to the directional field winding 23c and the current flowing in this field winding are correspondingly increased. However, the ampere turns of the directional field winding 23c are in the wrong direction, i. e. they are in a direction to strengthen the field of the machine 10 and the increase in ampere turns must therefore be balanced out by an equal number of ampere turns of the current control winding 23d. Although the armature current of the machine 10 is reduced, it is not restored to the preset value from which it departed. It remains sufficiently greater than the preset value to cause the current control field winding 23d to produce sufficient ampere turns to weaken the field of the machine 10 plus the number of ampere turns required to balance out the increased ampere turns of the directional field winding produced by the decreased voltage across the resistor 24.

This operation progresses until at the end of the unwinding operation the amplidyne exciter 23 is producing full voltage of reverse polarity. Thus, minimum voltage which was assumed to be one fourth the initial maximum voltage is applied to the field circuit of machine 10. Consequently, the voltage drop across the resistor 24 is decreased in the same ratio. In the absence of the non-linear resistance 23 in parallel with the control field winding 23c a decreased voltage drop across resistor 24 would increase the ampere turns of the directional field winding in the same ratio and a very large departure of the armature current of the machine 10 from the preset value would be required to cause the current control field winding 23d to balance them out. However, as explained in connection with the winding reel motor, a relatively small portion of the increased current flows through the directional field winding and thus only a correspondingly small departure of the armature current of machine 10 from the preset value is required to balance out the resulting increased ampere turns of the directional field winding. The reduction in the departure of the armature current from the preset value made possible by the nonlinear resistance 33 is, as in the case of the winding reel motor, more than 50%. Since the strip tension is proportional to armature current, a corresponding improvement in the regulation of the tension is obtained. The greatest reduction in deviation of the tension from the preset value is attained at light tensions. This is especially advantageous because light tensions are usually employed on exceedingly thin strip materials which are subject to rupture as a result of variations in tension.

During acceleration, inertia of the armature of the dynamo electric machine 10 imposes an additional pull on the strip which increases its tension. However, such increase in tension is prevented by the opening of the normally closed contacts 20c of the accelerating contactor, which is picked up when the master switch 22 is in the accelerating position, to insert a portion of the resistor 48 in circuit with the IR drop resistor 30. As a result, the voltage of the inserted portion of the resistor 40 is added to the voltage of the IR drop resistor 30 so that the regulating system is balanced at a lower armature current of dynamo electric machine 10. In other words, the armature current of dynamo electric machine 10 is decreased by an amount sufficient to prevent an increase in tension.

Similarly, during deceleration, the inertia of the armature of the machine 10 relieves the pull on the strip, thereby tending to decrease its tension. However, this is prevented by the opening of the contacts 21c of the decelerating contactor to insert resistor 29 in series with the active portion of the rheostat 28. As a result, the voltage across the resistor 29 is added to the voltage across the active portion of rheostat 28, thereby increasing the effective reference voltage so that the machine 10 is required to supply an increased armature current in order to produce a balanced condition.

The system may be decelerated to rest by operation of the master switch 22 to the slow position in which the decelerating contactor closes its normally closed contacts 21a and opens normally closed contacts 21b to energize the motor 19 for rotation in a direction to return the slider 13a of the generator field rheostat to the low speed position.

The apparatus may be stopped by depressing the "stop" push button switch to interrupt the energizing circuit for the operating coil of the control relay 50. In response to deenergization, the relay 50 drops out and opens its normally open contacts 50a and 50b. It also opens its normally closed contacts 50c to interrupt the sealing-in circuit and the stop button may now be released since the energizing circuit for the coil will remain open at the normally open contacts of the starting switch. Contacts 50a and 50b in opening interrupt the energizing circuits for the operating coils of the line contactors 51 and 52 which open their normally closed contacts 51a and 52a respectively to disconnect the armatures of the dynamo electric machine 10 and the motor 6 from the armature of the supply generator 7. Simultaneously, contacts 51 and 52 close their normally closed contacts 51b and 52b to complete energizing circuits for the operating coils of the dynamic braking contactors 46 and 44 respectively which pick up and close their contacts 46a and 44a to complete dynamic braking circuits for the armatures of the machine 10 and the motor 6 through dynamic braking resistors 47 and 45 respectively. In closing, the dynamic braking contactors open their normally closed contacts 46b and 44b to interrupt the energizing circuits for the operating coils of the field control relays 31 and 38. Relay 31 opens its normally open contacts 31a and relay 38 opens its normally open contacts 38a and 38b and closes its normally closed contacts 38c, thereby to apply maximum braking torque for stopping motor 6. The system is left in a reset condition.

Although in accordance with the provisions of the Patent Statutes this invention is described as embodied in concrete form and the principle thereof has been explained together with the best mode in which it is now contemplated applying that principle, it will be understood that the apparatus shown and described is merely elective and that the invention is not limited thereto since alterations and modifications will readily suggest themselves to persons skilled in the art without departing from the true spirits of the invention and the scope of the annexed claims.

What I claim as new and desire to secure by Letters Patent of the United States is:

1. A control system for a main dynamo electric machine provided with a main field winding comprising a pair of supply terminals adapted to be connected to a source of supply, a voltage divider connected across said terminals, means for varying the excitation of said field winding comprising an exciter dynamo electric machine having its armature connected in circuit with said field winding across said terminals and provided with a directional field winding connected between a point in the circuit of said main field winding and a point on said voltage divider and with an opposing control field winding connected to be excited by the armature current of said main dynamo electric machine for regulating the armature current thereof, and a non-linear resistance device connected in parallel with said directional field winding for minimizing the change in armature current required to effect a predetermined change in the current of said main field winding.

2. A control system for a main dynamo electric machine provided with a main control field winding comprising in combination a pair of terminals adapted to be connected to a source of supply, an excitation circuit for said field winding connected across said terminals, means for producing a signal voltage dependent upon an operating characteristic of said main machine, a source of first and second reference voltages, an exciter dynamo electric machine having its armature connected in said excitation circuit and provided with a control field winding connected to be excited in response to the difference of the voltage drop across a portion of said excitation circuit and said first reference voltage and further provided with an opposing control field winding connected to be excited in response to the difference of said signal voltage and said second reference voltage.

3. A control system for a main dynamo electric machine having a main field winding comprising a pair of supply conductors, a voltage divider connected across said conductors, an excitation circuit for said field winding connected across said conductors, a voltage dropping resistor included in said circuit, means for producing a reference voltage, means for producing a signal voltage dependent on an operating characteristic of said dynamo electric machine, an exciter dynamo electric machine having its armature connected in said circuit and a directional control field winding connected to be responsive to the difference of the voltage across said resistor and the voltage across a selected portion of said divider and further provided with an opposing control field winding responsive to the difference of said signal voltage and said reference voltage for controlling said exciter machine to counteract changes in said signal voltage.

4. A control system for a main dynamo electric machine having a main field winding comprising in combination a pair of supply conductors, a voltage divider connected across said conductors, an excitation circuit for said field winding connected across said conductors, a voltage dropping resistor included in said circuit, means for producing a reference voltage, means for producing a signal voltage dependent upon an operating characteristic of said main machine, an exciter dynamo electric machine having its armature connected in said circuit and a directional control field winding connected between said excitation circuit and a point on said voltage divider so as to be responsive to the difference of the voltage across said resistor and the voltage across a selected portion of said divider, and further provided with an opposing control field winding connected to be responsive to the difference of said signal voltage and said reference voltage for controlling said exciter to vary the current in said main field winding to counteract variations in said signal voltage, and a non-linear resistance device connected across said directional control winding for minimizing the change in said signal voltage required to effect a predetermined change in the current of said main field winding.

5. A control system for a dynamo electric machine required to produce a progressively varying torque while operating at constant horsepower comprising in combination a pair of supply conductors, a voltage divider connected across said conductors, an excitation circuit for the field of said machine connected across said conductors, a voltage drop device connected in said circuit, means for producing a reference voltage, means for producing a signal voltage proportional to the armature current of said machine, an exciter having its armature connected in said circuit, and provided with a directional control field winding connected to be excited in response to the difference of the voltage across said voltage drop device, and the voltage across a selected portion of said divider and also provided with an opposing control field winding connected to be excited by the difference of said reference voltage and signal voltage to control said exciter to counteract variations in said armature current, and a non-linear resistance device connected to parallel with said direction field, winding for minimizing the change in said armature current required to effect a predetermined change in the current in said excitation circuit.

6. A control system comprising in combination, an adjustable voltage generator, a dynamo electric machine which is subjected to a constant power variable torque load and is connected to pump back to said generator, a pair of supply conductors, a voltage divider connected across said conductors, an excitation circuit for the field of said machine connected across said conductors, a voltage drop device connected in said circuit, means for producing a signal voltage proportional to the armature current of said machine, means for producing a reference voltage, an exciter having its armature connected in said circuit and provided with a directional control field winding connected to be excited in response to the difference of the voltage across said voltage drop device and the voltage across a selected portion of said divider and also provided with an opposing control field winding connected to be excited by the difference of said reference voltage and signal voltage to control said exciter to counteract variations in said armature current, means for decelerating said dynamo electric machine, and means responsive to operation of said decelerating means for adding a voltage to said signal voltage thereby to effect a reduction in said armature current during deceleration.

7. A control system comprising in combination, an adjustable voltage generator, a dynamo electric machine which is subjected to a constant power variable torque load and is connected to pump back to said generator, a pair of supply conductors, a voltage divider connected across said conductors, an excitation circuit for the field of said machine connected across said conductors, means for producing a reference voltage comprising a second voltage divider connected across said conductors, a potentiometer connected to said supply conductors, means for producing a signal voltage proportional to the armature current of said dynamo electric machine comprising a voltage drop resistor connected in the armature circuit of said machine and having one terminal connected through a selected portion of said potentiometer to one of said supply conductors, a contactor for short circuiting said portion of said potentiometer, an exciter having its armature connected in said excitation circuit and provided with a directional control field connected to be responsive to the difference of the voltages across said first voltage drop device and said selected portion of said first divider and provided with an opposing control field winding connected to be responsive to the difference of said signal and reference voltages for controlling said exciter to counteract changes in said armature current, means for decelerating said dynamo electric machine, and means responsive to operation of said decelerating means for opening said contactor to add the voltage across said portion of said potentiometer to said signal voltage thereby to effect a reduction in said armature current during deceleration.

ANTON W. SCHMITZ.

REFERENCES CITED

The following references are of record in the file of this patent:

UNITED STATES PATENTS

| Number | Name | Date |
|---|---|---|
| 2,305,937 | Montgomery | Dec. 22, 1942 |